United States Patent
Meng et al.

(10) Patent No.: US 8,791,184 B2
(45) Date of Patent: Jul. 29, 2014

(54) TWO-COMPONENT POLYURETHANE ADHESIVES WITH THIXOTROPIC EFFECT

(71) Applicants: Henkel (China) Co. Ltd., Shanghai (CN); Henkel AG & Co. KGaA, Duesseldorf (DE); Henkel (China) Investment Co. Ltd., Shanghai (CN)

(72) Inventors: Qingwei Meng, Shanghai (CN); Yonghua Zhao, Beijing (CN); Nicole Knips, Duesseldorf (DE); Hongxia Zhao, Shanghai (CN); Lothar Thiele, Langenfeld (DE)

(73) Assignees: Henkel AG & Co. KGaA, Duesseldorf (DE); Henkel (China) Investment Co. Ltd., Shanghai (CN); Henkel (China) Co. Ltd., Shanghai (CN)

( * ) Notice: Subject to any disclaimer, the term of this patent is extended or adjusted under 35 U.S.C. 154(b) by 0 days.

(21) Appl. No.: 13/796,866

(22) Filed: Mar. 12, 2013

(65) Prior Publication Data

US 2013/0186559 A1   Jul. 25, 2013

Related U.S. Application Data

(63) Continuation of application No. PCT/CN2010/078363, filed on Nov. 3, 2010.

(51) Int. Cl.
*C09J 175/04* (2006.01)
*C09J 5/02* (2006.01)

(52) U.S. Cl.
USPC .......................................... 524/236

(58) Field of Classification Search
USPC ................................... 524/251, 236
See application file for complete search history.

(56) References Cited

U.S. PATENT DOCUMENTS 3,489,723 A * 1/1970 Kraft ............................... 528/48
5,338,767 A * 8/1994 Sartelet et al. ................ 521/159

FOREIGN PATENT DOCUMENTS

| JP | 05-263061 | * | 3/1991 | ............ C09J 175/04 |
| JP | 5263061 A | | 10/1993 | |
| JP | 2006111805 A | | 4/2006 | |
| WO | 9110691 A1 | | 7/1991 | |
| WO | 9318074 A1 | | 9/1993 | |

OTHER PUBLICATIONS

Machine translation of JP 05-263061. Mar. 1991.*
International Search Report issued in connection with International Patent Application No. PCT/CN2010/078363 mailed on Aug. 11, 2011.

* cited by examiner

*Primary Examiner* — John Uselding
(74) *Attorney, Agent, or Firm* — James E. Piotrowski

(57) ABSTRACT

A two-component polyurethane adhesive is provided, which comprises a component A comprising at least one polyol with a molecular weight of more than 500 g/mol, a component B comprising at least one polyisocyanate with a molecular weight of less than 1000 g/mol, and additional additives. The component A contains 0.1 to 10 wt. % sterically hindered amines having primary amino groups.

15 Claims, No Drawings

TWO-COMPONENT POLYURETHANE ADHESIVES WITH THIXOTROPIC EFFECT

The present invention relates to two component polyurethane adhesives containing hindered polyamines which provide a thixotropic effect to adhesive mixture.

JP 2006-1 1 1805 discloses a system containing a kind of polyurethane prepolymer, a siloxan compound being a polyalkoxysiloxan and as hardening agent a polyamine compound. In the list of polyamines also sterically hindered amines are disclosed.

WO 91/10691 discloses a two component adhesive system whereby the curative mixture contain a polyol, slow reacting diamine, selected from aromatic diamines, hindered diamines or polyamines, and as additional component fast reacting aliphatic or cycloaliphatic diamines or polyamines.

WO 93/18074 discloses a two components polyurethane adhesive comprising a kind of polyurethane prepolymer and a curative mixture of di-amine compound and polyol. The polyurethane prepolymer is manufactured by reaction of an excess of an aromatic isocyanate with a polyol component. Such polyurethane prepolymer have the disadvantage that the viscosity is high. So a low viscosity adhesive is not disclosed. Additionally the open time of the adhesive is short, normally less than 10 minutes.

The U.S. Pat. No. 5,338,767 discloses a two component system comprising a polyol component and a polyisocyanate component. Such polyol component incorporates a mixture of a polyamidoamine and aromatic polyfunctional amines which shows a thixotropic behavior. The examples show that polyamidoamine is a key additive for a good thixotropic effect.

The adhesives of the prior art show the effect, that the curing of isocyanate groups with primary or secondary amino groups proceeds as a fast reaction. This leads to an increase in viscosity. Consequently after mixing the non-cured adhesive is difficult to apply. Especially if an application is required to a large surface and the processing needs some time this increase in the molecular weight is detrimental to the application process. Additionally the high reactivity is problematic if the adhesive flow into gaps, holes or surface parts and provide a good wetting to the substrate. On the other hand if the adhesive is fluid it is not possible to apply a thick layer of adhesive as it will flow from the substrate. The known polymeric amines in NCO curing systems provide a high reactivity but the viscosity is increasing fast. It is also known that PU adhesives are flexible. This is not intended if the bonded substrates will be subject high mechanical force but keep its shape.

It is the object of the invention to provide an adhesive based on a two component reactive polyurethane system which have a low viscosity after mixing but additionally build up a thixotropic effect so that the adhesive will not be free flowing without external pressure. The adhesive should be applicable without primer and show an excellent adhesion to the substrates. The mechanical properties will be high and not decrease exposure to mechanical stress and weathering conditions like moisture, temperature or light of the environment.

The object is achieved by a two component polyurethane adhesive consisting of a component A comprising at least one polyol with a molecular weight of more than 500 g/mol (number average molecular weight, $M_n$,) and a component B comprising at least one polyisocyanate, comprising optionally additional additives characterized that component A contains 0.1 bis 5 weight % of steric hindered amines containing primary aromatic amino groups.

Another embodiment of the invention is a bonded structure consisting of a substrate, a cured adhesive and a second substrate, wherein the cured adhesive would have a glass transition temperature more than 50° C. and a modulus (G') of at least 15 MPa. Another embodiment of the invention is a process to bond two substrates by mixing a 2 component adhesive, applying it directly after mixture by pumping to a substrate surface forming a non flowing non cured layer of the adhesive and bonding a second substrate to this surface.

The two component polyurethane adhesives (2C PU) consist of a liquid component A containing polymers and/or oligomers which contain acidic H-atoms, like OH, SH groups, and amino compounds comprising at least one secondary or preferably primary amino group, the other liquid component B contain polyisocyanates. In each of the components additional additives can be incorporated proviso they do not react with the reactive groups of the other compounds during storage. So the stability of the 2C PU composition is ensured.

One part of the adhesive is component A comprising one or more polyols different in molecular weight, functionality or chemical composition. It is required that at least on polyol have a molecular weight of more than 500 g/mol. The polyol can be selected form a broad range of commercially available products, e.g. polyetherpolyols, polyesterpolyols, oleochemical polyols, aliphatic, cycloaliphytic or aromatic polyols, OH-group containing polymeric or oligomeric compounds like polycarbonates, polybutadienes, polyacrylates or mixtures thereof. Especially the mixture of the polyols will be liquid at room temperature of about 25° C.

One group of suitable polyols is polyester-polyols which can be prepared by condensation of di- or tricarboxylic acids. The polycarboxylic acids may be aliphatic, cycloaliphatic, aromatic or heterocyclic or mixtures thereof. Examples of suitable acids are aliphatic acids, like adipic acid, sebacic acid, glutaric acid, azelaic acid, suberic acid, undecanedioic acid, dodecandioic acid, 3,3-dimethylglutaric acid, hexahydrophthalic acid; aromatic acids like phthalic acid, terephthalic acid, isophthalic acid; unsaturated acids like maleic acid, fumaric acid, dimer fatty acid; tricarboxylic acids like citric acid and trimellitic acid. It is possible to use polyester polyols obtained by reacting low molecular weight alcohols like ethylene glycol, diethylene glycol, neopentyl glycol, hexanediol, butanediol, propylene glycol, glycerol or trimethylol propane, dipropylene glycol, 1,4-butanediol, 1,6-hexanediol, 1,8-octanediol, 1,10-dicanediol, 1,12-dodecanediol, dinner fatty alcohol, 1,4-hydroxymethyl cyclohexane, 2-methyl propane-1,3-diol, butane-1,2,4-triol, triethylene glycol, tetraethylene glycol, polyethylene glycol, dipropylene glycol, polypropylene glycol, dibutylene glycol and polybutylene glycol. Also triols can be used like glycerol, trimethylolpropane or mixtures thereof.

Another group of suitable polyester polyols are based on ε-caprolactone, also called polycaprolactones, or on hydroxycarboxylic acids, for example ω-hydroxycaproic acid. Such polyols contain at least two OH groups' preferably terminal OH groups.

Another group of polyols are polyacetals. Polyacetals are understood to be compounds obtainable by reacting glycols, for example diethylene glycol or hexanediol or mixtures thereof, with formaldehyde. Polyacetals suitable for the purposes of the invention may also be obtained by polymerizing cyclic acetals. Another group of polyols are polycarbonates. Polycarbonates may be obtained, for example, by reacting diols, such as propylene glycol, butane-1,4-diol or hexane-1, 6-diol, diethylene glycol, triethylene glycol or tetraethylene glycol or mixtures of two or more thereof, with diaryl carbonates, for example diphenyl carbonate, or phosgene. Also suitable for use in the invention are hydroxyfunctional polybutadienes, known by the commercial name of Poly-bd.

Another group of polyester polyols which are useful in the invention are the so called oleochemical polyols. Such polyester polyols can be prepared, for example, by complete ring-opening of epoxidized triglycerides of a fat mixture which comprises at least partly olefinically unsaturated fatty acids with one or more alcohols having 1 to 12 alcohols and subsequent partial transesterification of the triglyceride derivatives to give alkyl ester polyols having 1 to 12 C atoms in the alkyl radical. Another group of such preferably suitable polyols based on natural products are dimer diols, as well as castor oil and derivatives thereof.

Other suitable polyol components are polyetherpolyols which are the reaction products of low molecular weight polyhydric alcohols with alkylene oxides. The alkylene oxides preferably contain 2 to 4 carbon atoms. Suitable reaction products of the type in question are, for example, the reaction products of ethylene glycol, propylene glycol, the isomeric butane diols, hexane diols or 4,4'-dihydroxydiphenyl propane with ethylene oxide, propylene oxide or butylene oxide or mixtures of two or more thereof. The reaction products of polyhydric alcohols, such as glycerol, trimethylol ethane or trimethylol propane, pentaerythritol or sugar alcohols or mixtures of two or more thereof, with the alkylene oxides mentioned to form polyether polyols are also suitable. Such polyetherpolyols are available in different molecular weight, composition, as homopolymer or statistical or block-copolymer. Another group of polyetherpolyols are polytetramethylenglycoles which can be prepared by polymerisation of tetrahydrofuran.

The polyols used according to the invention have a molecular weight of 500 to 5000 g/mol (number molecular weight, $M_N$). Preferably the molecular weight in the range from 700 to 3000 g/mol. Particularly preferred are polyether polyols, like polypropylene glycols and/or oleochemical polyols, like castor oil.

In addition to the above mentioned polyols having a molecular weight of more then 500 g/mol other polyols having a lower molecular weight can be used in the polyol component A. One group of such polyols are polyalkylenpolyols, preferably diols or triols for example $C_2$ to $C_{20}$ diols, like ethylenglycol, propylenglycol, butandiol-1,2 or -1,4, petane diol-1,5, hexanediol-1,6, octane-diol 1,8, dodecandiol-1,12, dimeric fatty acid alcohols or higher homologuous diols or their isomers. Also suitable are polyetherglycols with low molecular weight of less than 500 g/mol. Additionally polyols with more then 3 functional groups can be used, like glycerole, trimethylolethane, pentaerythrit und/oder trimethylolpropane, or higher functional alcohols like sugar alcohols.

According to the invention the mixture of polyols contain at least 65% by weight of polyols with a molecular weight above 500 g/mol, preferably more than 80 wt %, most preferred more than 95 wt %. The polyols can be used as single polyol component or as mixture. The mixture is liquid at 25° C.

Component A contains additionally at least one amine having one or more primary or secondary amino groups. Such compound includes aliphatic, cycloaliphatic or preferably aromatic amines having a molecular weight of less than 1000 g/mol, preferably containing one or two amino groups. It is necessary that the amino groups of this compound are sterically hindered such that at least one position adjacent to a $NH_2$-group is bearing a bulky substitute as part of the structure.

Aliphatic amines include linear aliphatic amines or diamines, for example secondary amines, like 2,4,4-trimethyl hexamethylenediamine; cyclic aliphatic amines like cyclohexylene diamine, dicyclohexylene diamine, 4,4'-dicyclohexyl-methan-diamine, isophorone diamine, 1,3-bis(aminomethyl)cyclohexane, 1,4-bis(amino methyl)cyclohexane, and hydrogenated toluene diamines such as 1-methyl-2,4-diaminocyclohexane, 1-methyl-2,6-diaminocyclohexane, 1,4-cyclohexane diamine; 4,4'-methylene-bis-cyclohexylamine, 4,4'-isopropylene-bis-cyclohexylamine, isophoronediamine. Particularly primary amines are suitable which contain one or two alkyl substituents in the a-position to the amino group.

In a preferred embodiment the amino compounds contain aromatic amino groups. Preferably such compounds contain one or especially two aromatic ring systems. Examples of suitable amines are according to formula (I), (II), (III), (IV)

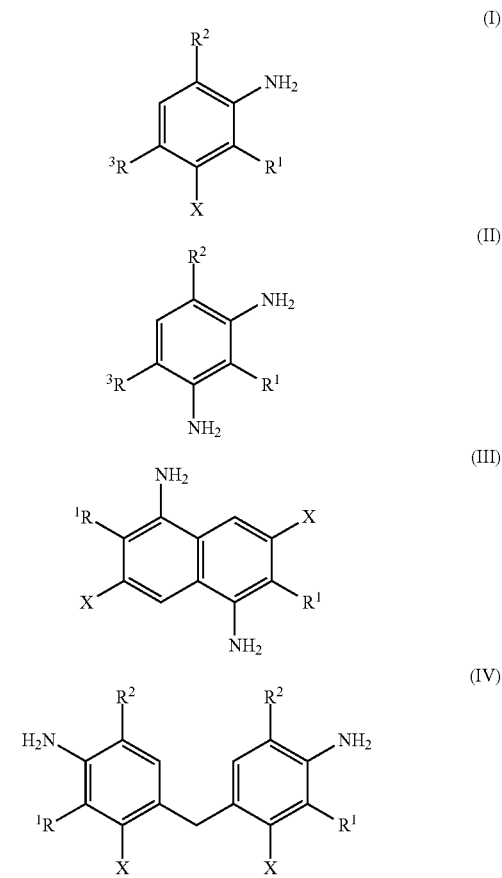

in which R1, R2, R3 are independently selected from linear or branched alkyl radicals having 1 to 18 C— atoms, alkylradicals having 1 to 12 C— atoms containing at least one —O— or —S— group, or H, proviso that at least R1 or R2 is different from H. Preferably R1, R2, are methyl, ethyl, propyl, isopropyl, butyl, isobutyl, tert. butyl, hexyl, isohexyl; —S— methyl, —S-ethyl, —S-(iso)propyl, —S-(tert.)butyl, —O-methyl, —O-ethyl, —O-isopropyl, —O-tert.-butyl; or H and R3 is methyl, ethyl, propyl, isopropyl, butyl, isobutyl, tert. butyl, hexyl, isohexyl; or X. Most preferred R1 and R2 are not H, especially R1 is the same as R2.

X is a halogen atom, —CN or —H, preferably Cl, Br or H. One or preferably both $NH_2$ group can be replaced by an —NH-Alkyl group, alkyl being a C1 to C4 group.

Preferred are aromatic diamines with primary amino groups.

In particular both a-substitutes to the amino groups are alkyl groups or —S—

Alkyl groups, preferably the same groups.

Another preferred embodiment comprises —S-methyl, -ethyl or -propyl as substitute.

Another preferred embodiment includes primary aromatic diamines containing one or two halogen atom as substitute in the ring structure.

Most preferred dialkyl-substituted phenyldiamines (formula II) or dialkyl-substituted methylen-di(phenylamines) (formula IV) are used.

Examples of suitable compounds are 2,4-diamino-mesithylene, 1,3,5-triethyl-2,4-diaminobenzene, 1,3,5-triisopropyl-2,4-diaminobenzene, 4,6-dimethyl-2-ethyl-1,3-diaminobenzene, 1-methyl-3,5-diethyl-2,4-diaminobenzene, 4,4'-Di-(sec-butylamino)-diphenylmethane, 2,4-dithiomethyl-6-chloro-1,3-diaminobenzene, 2,4-dithiomethyl-6-methyl-1,3-diaminobenzene, 2-thiomethyl-4-propyl-6-methyl-1,3-diaminobenzene, 4,4'-Di-amino-3,3'-diisopropyl-5,5'-dimethyl-diphenyl-methane, 4,4'-Di-amino-3,5,3',5'-tetraisopropyl-diphenylmethane, 4,4'-Di-amino-3,5,3',5'-tetraethyl-diphenylmethane, 4,4'-diamino-3,3',5,5'-tetramethyl-diphenyl-methane, 4,4'-diamino-2,2'-dichloro-3,3',5,5'-tetraethyl-diphenylmethane. Such products can also be used as technical grade which may contain some byproducts.

The amino compound may comprise a mixture of different amino compounds; preferably a single amino compound is used. The amino compound has a low molecular weight, preferably less than 500 g/mol. Polyamines like polyetherdiamines, polyfunctional alkylamines or polyamidoamines will be excluded.

The amount of the amino compound comprises 0.1 to about 10 wt-% of the 2C PU composition, preferably 0.2 to 5 wt %.

The component B comprises at least one polyisocyanate. As polyisocyanate a large number of aliphatic, cydoaliphatic or aromatic polyisocyanates can be used, for example monomeric polyisocyanates, oligomers of polyisocyanates or NCO-group containing PU-prepolymers with a low molecular. As preferred embodiment diisocyanates and its oligomers are used. Preferably the component B is liquid at 25° C.

Examples of suitable isocyanates are aromatic isocyanates like 1,5-naphthylene diisocyanate, 2,2-, 2,4- or 4,4'-diphenylmethane diisocyanate (MDI), crude MDI, xylylene diisocyanate (XDI), tetramethyl xylylene diisocyanate (TMXDI), di- and tetraalkylene diphenylmethane diisocyanate, 4,4'-dibenzyl diisocyanate, 1,3-phenylene diisocyanate, 1,4-phenylene diisocyanate, the isomers of toluene diisocyanate (TDI), phthalic acid-bis-isocyanatoethyl ester; cydoaliphatic or aliphatic isocyanates, like hydrogenated MDI (H12MDI), 1-methyl-2,4-diiso-cyanatocyclohexane, hydrogenated xylylene diisocyanate ($H_6$XDI)1,6-diiso-cyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, lysine-diisocynate.

Suitable oligomers of isocyanates are polyisocyanate formed by trimerization or oligomerization of diisocyanates, like biuret, uretdione or carbodiimide of diisocyanates, for example trimerization products of HDI, MDI, TDI or IPDI. Another embodiment uses reaction products of polyols with an excess of isocyanates. Such prepolymers have a molecular weight below 2000 g/mol, preferably below 1000 g/mol.

Preferably aromatic polyisocyanates are used, particularly suitable are aromatic diisocyanates including 2,2'-, 2,4'- or 4,4'-diphenyl methane diisocyanate (MDI), the isomers of toluene diisocyanate (TDI), tetramethylxylylene diisocyanat (TMXDI) or naphthalene-1,5-diisocyanate (NDI). Such isocyanates can be used as pure component, as technical grade, as mixture of isomers or as mixture.

In addition the adhesive according to the invention may contain auxiliary materials, which are preferably admixed wholly or partially with the polyol component. Auxiliaries mean substances which are generally added in small quantities in order to modify the properties of the adhesive in a desired direction, for example viscosity, wetting behavior, stability, rate of reaction, storage life or adhesion. Such additives for the improvement of special properties are for example antifoam agents, wetting agents or surfactants, like stearates, silicone oil and addition products of ethylene oxide or propylene oxide with fatty alcohols; UV stabilizers antioxidants, like sterically hindered phenols, thioethers, substituted benzotriazoles or from the HALS type; adhesion promoters for example silanes containing hydrolysable groups like hydroxy functional, (meth)acryloxy functional, amino functional or epoxyfunctional trialkoxysilanes, including methoxy, ethoxy, propoxy or butoxy groups; fire retardants.

Generally solvents will be excluded but it is possible that small amounts of less than 2 wt % (calculated to the total adhesive composition) are present being a byproduct of commercial forms of additives. The adhesive according to the invention should furthermore preferably contain no plasticizers.

To increase the reactivity of the adhesive for crosslinking the adhesive may optionally contain catalysts. Suitable catalysts which can be employed according to the invention are, in particular, the organometal and/or aminic catalysts. Examples include titanates like tetrabutyl titanate or tetrapropyl titanate, dibutyl tin dilaulate (DBTL), dibutyl tin diacetate, tin octoate, dibutyl tin oxide, chelated metals, like Zr-acetylacetonate, Ti-acetylacetonate, Fe-acetylacetonate, amino compounds like triethylenetetramin, triethylenediamin diethylaminopropylamin, morpholin, N-methylmorpholin, 1,8-diazabicyclo-(5,4,0)-undecen-7 (DBU), cyclohexylamin, 2-ethyl-4-methylimidazole. Catalysts are incorporated especially in case of aliphatic isocyanates in component B.

Another group of additives are tackifying resins. Resins are known in different composition and types as synthetic resin or as natural resin. Examples for such resins are abietic acid, abietic acid esters, terpene resins, terpene/phenol resins, poly-a-methylstyrene or aliphatic, aromatic or aromatic/aliphatic hydrocarbon resins or coumarone/indene resins. These tackifying resins may optionally contain active hydrogen atoms, so that they can be incorporated into the binder matrix of the adhesive during reaction with the diisocyanates or polyisocyanates.

Optionally the adhesive may contain pigments or fillers. Such additives can be used to modify specific properties of the adhesive. Examples are oxides, silicates, sulfates, phosphates or carbonates of Ti, Zr, Al, Fe, Mg, Ca, Ba or Zn, such as natural, ground chalk, precipitated chalk, barytes, talcum, mica, carbon black, titanium dioxide, iron oxides, aluminum oxide, zinc oxide, zinc sulfate or silicon dioxide. Water-absorbing powders, for example zeolite, may also be present as a filler. The fillers should be present in finely divided form, for example of 1 to 200 μm, in particular up to 50 μm, in size, but they may also be nano-scale pigments.

In a specific embodiment of the invention the composition contains silicon dioxide. Examples include treated silicas, precipitated silica, untreated silica especially pyrogenic silica or fumed silica is useful. The amount of such compound should be better from 0.1 to 5 wt % (calculated to the total 2C PU).

In a specific embodiment of the invention the composition includes additionally polymers containing a plurality of carboxylic acid groups and/or hydroxyl groups. As this compound can react with isocyanates it is included in component A. Such components can be selected for examples from polycarboxylic polyhydroxy acid amides, polycarboxylic acid amides, and modified polyhydroxy ureas. Such polymers are known as physically thixotropy agents and are commercially available. They are disclosed for examples in U.S. Pat. No. 6,420,466 or EP1048681. The amount of such compound is 0 or from 0.5 to 5 wt % of the total composition preferably up to 3 wt %.

In principle the different additives and auxiliaries can be included in each of the components. But it is useful to select such additives which do not react with the other compounds of component A or B. In specific embodiments the catalyst is added in component A, in another embodiment the silica is contained in the component B.

A preferred composition of an adhesive consist of a component a comprising
50 to 80 wt % of a polyol, having a molecular weight of more than 500 g/mol,
0.1 to 10 wt % of a sterically hindered amine,
10 to 50 wt % of additives, selected from stabilizers, adhesion promoters, catalysts, pigments, fillers or carboxylic acid polymers,
and a component B containing
90 to 99 wt % of an aromatic polyisocyanate,
1 to 10 wt % of additives, selected from stabilizers, adhesion promoters, pigments, silica,
the sum of the constituents of each component amounts to 100 wt %.

The two-component polyurethane adhesive according to the invention is produced by producing the polyol component. To this end, the liquid polyols can be mixed, and then any solid fractions in the mixture should be dissolved. This may also be assisted by heating. The auxiliary materials are then pre-mixed and dispersed. The moisture content should be kept low, for example the quantity of water may be reduced by using molecular sieves. Some of the inert auxiliary substances may also be mixed into the isocyanate component. Such mixing, dissolving or dispersing processes are known. The two components are stored separately until use. For use, these two components are mixed together in a manner known per se and the mixture is immediately applied to the substrates to be glued.

The ratio of the isocyanate groups present in the isocyanate component to the OH groups present in the polyol including the NH groups of the sterically hindered amine is generally in the range of equivalence, it being convenient to provide a slight excess of isocyanate groups with regard to moisture present on the surface. The NCO/OH ratio should amount to between 0.90:1 and 1.5:1, in particular 1.0:1 to 1.3:1.

The viscosity of component A may comprise for example a range from 500 to 5000 mPa·s measured at a temperature between 20° C. to 50° C. The viscosity of component B may be in a range from 500 to 20000 mPa·s, preferably from 500 to 3000 mPa·s in case that no silica is contained, preferably up to 10000 mPa·s in case component B contains silica. The adhesive mixture according to the invention is in particular thixotropic. Due to the immediately starting reaction a constant viscosity cannot be measured after mixing the components.

The adhesive according to the invention should assume a liquid form at application temperature, i.e. between 10 and 40° C. It is pumpable and can be applied for example by nozzles. It should be applicable as a film or bead and, on application, should not run on the substrate.

Another embodiment of the invention is a process to apply an adhesive to a large substrate whereby the adhesive is a 2 component polyurethane adhesive, which is consisting of liquid components which develop after application to the substrate a non flowable form. In the process according to the invention the adhesive is mixed immediately before application. This can be performed by known mixing devices, for example static or dynamic mixers, which work in a continuous way. The adhesive is subsequently pumped and applied to the surface of the substrate. In this stage the chemical reaction is starting and the adhesive can be pumped. After application out of the nozzle the adhesive is not further subject to shear force and thixotropy will be established. The adhesive layer will flow into gaps of the surface but will remain non-flowing without external pressure as layer or bead. The adhesive could be pumpable for at least about 60 seconds. If the selection of sterically hindered amine or the polyol does not conform to the invention the reaction will occur too fast and the adhesive will remain applicable for less than 30 sec. If the alcohol is selected from higher molecular weight the reactivity will decrease and the mechanical stability will decrease. If the molecular weight is to low, the reactivity will be too high, so the open time to apply the adhesive is too short.

The 2C PU adhesive according to the invention may in particular be used for gluing fiber composite materials. Such substrates are produced as a molded part. They comprise a matrix polymer, i.e. epoxides, polyesters, polyamides or other crosslinked polymers, and fiber material, i.e. from aramid, polyester, carbon, polyethylene in form of rovings, non-woven or fabric. The surface to be glued should here be free of contaminants; it may be used directly from the production process. Provisional protection of such surfaces by a protective woven fabric, which is then removed before further processing, is also conventional. The adhesive according to the invention is applied onto this surface in the form of a layer, bead or spots. The layer may be up to 5 cm thick. The second substrate is then applied, aligned and optionally pressed and fixed. As this happens, the still non cured adhesive is distributed uniformly over the substrate surface. As the layer is applied with an elevated thickness, it is possible to ensure that unevenness of the surfaces to be glued is leveled out with adhesive and the substrates come into extensive contact.

The glue bond is then cured. This may proceed at ambient temperature; crosslinking may optionally also be accelerated by elevated temperatures of up to 80° C. After crosslinking, the adhesive according to the invention exhibits elevated mechanical strength. A glue bond exhibits tensile shear strength of above 15 MPa (FRP-FRP).

In order to improve a glue bond, it may be advantageous once the adhesive cross-linked, which is subjected the glued substrates to a heat treatment process. The adhesive bond should here be adjusted to an elevated temperature of between 40 and 100° C. for a period of between 30 minutes and 24 hours. Without being tied to a particular theory, it is assumed that this gives rises to internal ordering of the crosslink sites and crystalline domains, so resulting in stable service characteristics. The use of the two-component polyurethane adhesives according to the invention permits a reduction in crosslinking time or in the temperature required. The loads to which the composite materials are exposed during the manufacturing process are also reduced as a consequence. Heat treatment may likewise be limited or avoided.

Another embodiment of the invention is a bonded structure consisting of a substrate, a cured adhesive and a second substrate, wherein the cured adhesive is selected from 2 component polyurethane adhesive, comprising a component A, and a component B which is applied in liquid form and forms after application to the substrate a thixotropic layer. Useful adhesives for such purpose are disclosed above. Such adhesive provides a bonding layer between the substrates, which is stable as structural bond under different conditions of use.

The structural stability of the glue bond may, for example, be measured by means of the modulus of elasticity (G'). At a measurement temperature of from −10° C. to +70° C., this should be greater than 300 MPa. By selection of the components it is achieved that the adhesive presents a glass transition temperature of 50° C. to 130° C., in particular of 60 to 110° C.

Once cured, the adhesives according to the invention are mechanically stable even at elevated temperatures. In this way, gaps, crevices or cavities of different size may be filled with the adhesive and give rise to a strong bond. The layer of adhesive is also stable on exposure to fluctuating loads, as arise when the substrate is used as a rotor blade. The vibrations, changes in temperature or elevated exposure to moisture brought about by various environmental influences do not weaken the glue bond.

The following Examples illustrate the invention.
Test methods according to examples and specification:
acid number: mg KOH/g (EN ISO 21 14)
$T_g$: measured by DSC (DIN ISO 1 1357)
Molecular weight: number average mean, $M_N$, measured by GPC with polystyrene standard
Viscosity: Brookfield, EN ISO 2555
Modulus, elasticity: DIN EN ISO 527
Lap Shear strength: measured to DIN EN 1465.

It can be seen that the material can be mixed and thereafter has a low viscosity and can be pumped. After a period of time the pseudoplastic properties evolve and the material will form a non cured non flowing layer.

The samples having a different composition are either immediately thixotropic or they do not show such pseudoplastic behavior.

| Component A | 1 | 2 | 3 | 4 | 5 Control-1 | 6 Control-2 |
|---|---|---|---|---|---|---|
| Castor Oil | 62.5 | 60.5 | 58.5 | 39 | 39 | 39 |
| PPG (400) | 0 | 0 | 0 | 18 | 18 | 18 |
| PPG (450) | 0 | 0 | 0 | 23 | 23 | 23 |
| CaCO3 | 30 | 30 | 30 | 12 | 12 | 12 |
| Zeolith | 5 | 5 | 5 | 6 | 6 | 6 |
| Polyhydroxy-polycarboxylic acid | 1 | 1 | 1 | 4 | 4 | 0 |
| 4-[(4-amino-3-chlorophenyl)methyl]-2-chloroaniline | 1 | 3 | 5 | 0 | 0 | 0 |
| Bis(4-amino-2-chloro-3,5-diethylphenyl)methane | 0 | 0 | 0 | 2 | 0 | 10 |
| Component B | | | | | | |
| PMDI, technical grade | 27.4 | 28.1 | 28.8 | 96.5 | 96.5 | 96.5 |
| Aerosil 200 | 0.5 | 0.5 | 0.5 | 3.3 | 3.3 | 1.0 |
| Test Results | | | | | | |
| Glass Transition Temperature (Tg, ° C.) | 2.5 | −1.5 | −4.5 | −50 | −60 | −30 |
| Pseudo plastic property (seconds) | 80 | 50 | 30 | 70 | no | immediately |
| Anti sag stability (thickness of layer, mm) | >5 | >5 | >10 | >10 | no | -NA |

All compositions are made in parts by wt.
The compounds of component A are mixed at room temperature (about 25° C.). The content of water was less than 0.5%.
To manufacture of the adhesive the component A is mixed with component B.
Tg is measured by DSC after curing for 48 h at 40° C.,
Anti sag test a layer of the adhesive is applied in a defined thickness at 25° C., the layer is put vertically after 30 sec. The layer does not drop or flow downwards. Shear resistance is measured according to DIN EN 1465 at 25° C.
Pseudo plastic properties test: The material is mixed at 25° C. in a container and allowed to settle. Thixotropy is established which can be seen by turning the container bottom up. After the given time the material will not flow out.

What is claimed is:

1. A 2 component polyurethane adhesive consisting of
    a component A comprising at least one polyol with a molecular weight of more than 500 g/mol and
    a component B comprising at least one polyisocyanate with a molecular weight of less than 1000 g/mol,
the adhesive containing additional additives, wherein component A contains 0.1 to 10 weight % sterically hindered amine having primary amino groups, said hindered amine being selected from aromatic amines containing one or two amino groups, one or two aromatic rings and from 1 to 4 halogen substituents.

2. The 2 component polyurethane adhesive according to claim 1, wherein the polyisocyanate is selected from aromatic polyisocyanates with a molecular weight below 500 g/mol.

3. The 2 component polyurethane adhesive according to claim 1, wherein the polyisocyanate is selected from aromatic diisocyanates with a molecular weight below 500 g/mol.

4. The 2 component polyurethane adhesive according to claim 1, wherein the polyols are selected from polyester polyols, oleochemical polyols, polyether polyols, polyurethane polyols, polycarbonate polyols, polyalkylenediols and combinations thereof, having a molecular weight below 5000 g/mol.

5. The 2 component polyurethane adhesive according to claim 1, wherein the hindered amines contain in an a and/or a' position to the N-atom an equal or different linear, branched or cyclic alkyl substitute.

6. The 2 component polyurethane adhesive according to claim 5, wherein the aromatic amine is selected from diamines containing as structural element phenylendiamine or methylene-diphenylamine.

7. The 2 component polyurethane adhesive according to claim 1, wherein the sterically hindered amine is a primary aromatic diamine containing one or two halogen substituents in the aromatic ring structure.

8. The 2 component polyurethane adhesive according to claim 1, wherein component A comprises a polyhydroxy polycarboxylic acid polymer and component B comprises pyrogenic silica.

9. The 2 component polyurethane adhesive according to claim 1, wherein the adhesive is substantially free of organic solvents and/or plasticisers.

10. The 2 component polyurethane adhesive according to claim 1, wherein cured reaction products of the adhesive have a glass transition temperature above 50° C.

11. The 2 component polyurethane adhesive according to claim 10, wherein the cured reaction products have a storage modulus of more than 300 MPa.

12. The 2 component polyurethane adhesive according to claim 1, wherein the additives are selected from leveling agents, catalysts, dyes or pigments, adhesion promoters, stabilizers and combinations thereof.

13. The 2 component polyurethane adhesive according to claim 1, wherein the hindered amine is according to formula (I), (II), (III), (IV)

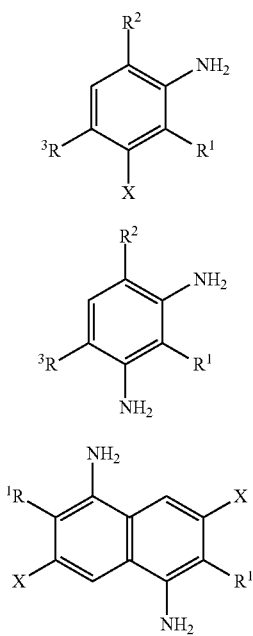

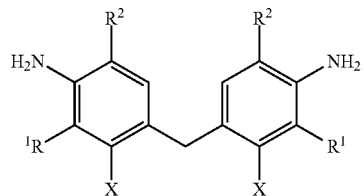

wherein R1, R2 and R3 are each independently selected from linear or branched alkyl radicals having 1 to 18 C-atoms, alkyl radicals having 1 to 12 C-atoms containing at least one —O— or —S— group, or H, with the proviso that at least R1 or R2 is different from H, and X is selected from a halogen atom, —CN or —H.

14. The 2 component polyurethane adhesive according to claim 13, wherein R1 and R2 are each independently selected from methyl, ethyl, propyl, isopropyl, butyl, isobutyl, tert. butyl, hexyl, isohexyl; —S-methyl, —S-ethyl, —S-(iso)propyl, —S-(tert.)butyl, —O-methyl, —O-ethyl, —O-isopropyl, —O— tert.-butyl, or H;

R3 is selected from methyl, ethyl, propyl, isopropyl, butyl, isobutyl, tert, butyl, hexyl, and isohexyl.

X is selected from Cl, Br or H.

15. A polyurethane adhesive consisting of components A and B, component A consisting of at least one polyol with a molecular weight of more than 500 g/mol; 0.1 to 10 weight % sterically hindered amine having primary amino groups, said sterically hindered amine being selected from aromatic amines containing one or two amino groups, one or two aromatic rings and from 1 to 4 halogen substituents; and optionally additives selected from leveling agents, dyes or pigments, adhesion promoters, stabilizers and combinations thereof; and component B comprising at least one polyisocyanate with a molecular weight of less than 1000 g/mol and optionally additives selected from leveling agents, dyes or pigments, adhesion promoters, stabilizers and combinations thereof.

* * * * *